United States Patent
Huang

(10) Patent No.: US 8,698,600 B2
(45) Date of Patent: Apr. 15, 2014

(54) METHOD AND CIRCUIT FOR ACCESSING RFID TAG

(75) Inventor: Chih Hua Huang, Hsinchu Hsien (TW)

(73) Assignee: MStar Semiconductor, Inc., Hsinchu Hsien (TW)

(*) Notice: Subject to any disclaimer, the term of this patent is extended or adjusted under 35 U.S.C. 154(b) by 437 days.

(21) Appl. No.: 12/551,920

(22) Filed: Sep. 1, 2009

(65) Prior Publication Data

US 2010/0073144 A1 Mar. 25, 2010

(30) Foreign Application Priority Data

Sep. 19, 2008 (TW) ................................ 97135963 A

(51) Int. Cl.
*H04Q 5/22* (2006.01)

(52) U.S. Cl.
USPC ..... 340/10.1; 340/10.2; 340/10.3; 340/10.31; 340/10.4; 340/10.5; 340/10.52; 340/572.4; 235/375; 235/385; 235/436; 370/458

(58) Field of Classification Search
USPC .......... 340/10.4, 10.2, 458, 10.1, 10.5, 10.51, 340/10.52, 3.41, 10.3, 10.31, 572.4; 235/375, 385, 436; 370/458
See application file for complete search history.

(56) References Cited

U.S. PATENT DOCUMENTS

| | | | | |
|---|---|---|---|---|
| 7,026,935 B2* | 4/2006 | Diorio et al. | ................ | 340/572.2 |
| 7,973,644 B2* | 7/2011 | Tuttle | ........................... | 340/10.1 |
| 8,120,469 B2* | 2/2012 | Adamee et al. | ............. | 340/10.2 |
| 8,207,856 B2* | 6/2012 | Tuttle | ......................... | 340/572.1 |
| 2002/0167405 A1* | 11/2002 | Shanks et al. | ............... | 340/572.1 |
| 2005/0280506 A1* | 12/2005 | Lobanov et al. | ............. | 340/10.1 |
| 2006/0071759 A1* | 4/2006 | Cooper et al. | ............... | 340/10.2 |
| 2006/0117066 A1* | 6/2006 | Smith et al. | ................ | 707/104.1 |
| 2006/0261956 A1* | 11/2006 | Sundstrom et al. | ........ | 340/572.2 |
| 2007/0075838 A1* | 4/2007 | Powell | ......................... | 340/10.2 |
| 2007/0120651 A1* | 5/2007 | Kobayashi et al. | ........ | 340/10.51 |
| 2007/0126555 A1* | 6/2007 | Bandy | .......................... | 340/10.2 |
| 2007/0236335 A1* | 10/2007 | Aiouaz et al. | ............... | 340/10.32 |
| 2007/0257776 A1* | 11/2007 | Kim et al. | .................... | 340/10.2 |
| 2008/0111663 A1* | 5/2008 | Yogeeswaran et al. | ...... | 340/10.2 |
| 2008/0111664 A1* | 5/2008 | Maguire | ....................... | 340/10.4 |
| 2008/0122583 A1* | 5/2008 | Bekritsky | .................... | 340/10.32 |
| 2008/0150674 A1* | 6/2008 | Park et al. | .................... | 340/3.41 |
| 2008/0280560 A1* | 11/2008 | Tuttle | ........................... | 455/41.2 |
| 2008/0309490 A1* | 12/2008 | Honkanen et al. | ......... | 340/572.1 |
| 2009/0058730 A1* | 3/2009 | Geissler et al. | .............. | 342/450 |
| 2009/0219143 A1* | 9/2009 | Ryoo et al. | ................... | 340/10.4 |
| 2010/0001843 A1* | 1/2010 | Bae et al. | ..................... | 340/10.2 |
| 2010/0127829 A1* | 5/2010 | Daneshmand et al. | ...... | 340/10.1 |
| 2010/0207731 A1* | 8/2010 | Horst et al. | ................... | 340/10.1 |
| 2010/0277287 A1* | 11/2010 | Choi et al. | ................. | 340/10.42 |

* cited by examiner

*Primary Examiner* — Benjamin C Lee
*Assistant Examiner* — Quang D Pham
(74) *Attorney, Agent, or Firm* — WPAT, PC; Justin King

(57) ABSTRACT

A radio frequency identification (RFID) tag access method and a circuit applied to an RFID tag to determine whether to respond to a command sent by a reader are provided. According to the access method, an extra reference value is used for adjusting a parameter or a count value, so as to increase or decrease the probability of generating a condition matching with a command sent by the reader. Therefore, the probability of the tag being accessed is adjusted, and the tag carrying urgent information shall be accessed prior to the tag without urgent information.

8 Claims, 3 Drawing Sheets

METHOD AND CIRCUIT FOR ACCESSING RFID TAG

CROSS REFERENCE TO RELATED PATENT APPLICATION

This patent application is based on a Taiwan, R.O.C. patent application No. 97135963 filed on Sep. 19, 2008.

FIELD OF THE INVENTION

The present invention relates to a radio frequency identification (RFID) technology, and more particularly, to an RFID technology of adjusting the probability of a tag being accessed.

BACKGROUND OF THE INVENTION

A conventional RFID system is illustrated in FIG. 1. The RFID system 100 comprises tags 110, a reader 120, radio frequency (RF) antennas 130, and a host 140 for processing identification signals. Non-contact data transmission between the tag 110 and the reader 120 is achieved by using RF signals. A communication protocol, for an example, the electronic product code (EPC) is a common transmission specification of such non-contact data transmission. In the communication protocol of the EPC, the reader 120 finds every tag 110 within a certain range and accesses content of the tags 110 according to a Q-algorithm or an anti-collision searching method. The reader 120 generates a Q value, and sends a query command having the Q value to every tag 110 within the range. The tag 110 randomly generates a count value according to the Q value when receiving the query command. Provided that when the generated count value is equal to 0, the tags 110 will then respond to the query command of the reader 120; and when only one of the tags 110 is responsive, the reader 120 transmits data to such tag 110. However, when more than one of the tags 110 simultaneously respond to the query command of the reader 120, the reader 120 again sends a command for resetting the Q value until that a count value of only one of the tags 110 is equal to 0.

In the foregoing Q-algorithm, as a result of all of the tags 110 having a same Q value and a same random procedure, the probability of randomly generating the count value of zero is the same. In other words, the probability of every tag 110 being accessed is the same. However, when there is one particular tag 110 carrying urgent information which needs to be accessed with a higher priority, the conventional Q-algorithm can not ensure that this tag 110 is accessed as quickly as possible.

SUMMARY OF THE INVENTION

One objective of the present invention is to provide an RFID technology of adjusting the probability of an RFID tag being accessed. A tag carrying urgent information is accessed prior to a tag without urgent information, so as to solve the problems in the prior art.

According to an embodiment of the present invention, an RFID tag access method is provided. The access method comprises steps of storing a parameter and a first reference value in a tag, generating a count range according to the first reference value, selecting a count value within the count range, and determining whether the tag should respond to a command sent by a reader according to the count value.

According to another embodiment of the present invention, an RFID tag access method is provided. The access method comprises steps of storing a parameter and a reference value in a tag, generating a count range according to the parameter, selecting a count value within the count range, subtracting the reference value from the count value to generate an adjusted count value, and determining whether the tag should respond to a command sent by a reader according to the adjusted count value.

Moreover, according to an embodiment of the present invention, an access circuit, applied to an RFID tag, for determining whether to respond to a command sent by a reader, is disclosed. The circuit comprises a memory, a count value generating circuit, and a controlling circuit. The memory stores a parameter and a first reference. The count value generating circuit generates a count range according to the first reference value, and selects a count value within the count range. The controlling circuit then determines whether the RFID tag should respond to the command according to the count value.

Furthermore, according to another embodiment of the present invention, an access circuit, applied to an RFID tag, for determining whether to respond to a command sent by a reader, is disclosed. The access circuit comprises a memory, a count value generating circuit, and a controlling circuit. The memory stores a parameter and a reference value. The count generating circuit generates a count range according to the parameter, selects a first count value within the count range, and subtracts the reference value from the first count value to generate a second count value. The controlling circuit then determines whether the RFID tag should respond to the command according to the count value.

DETAILED DESCRIPTION OF THE PREFERRED EMBODIMENT

Figure 1:
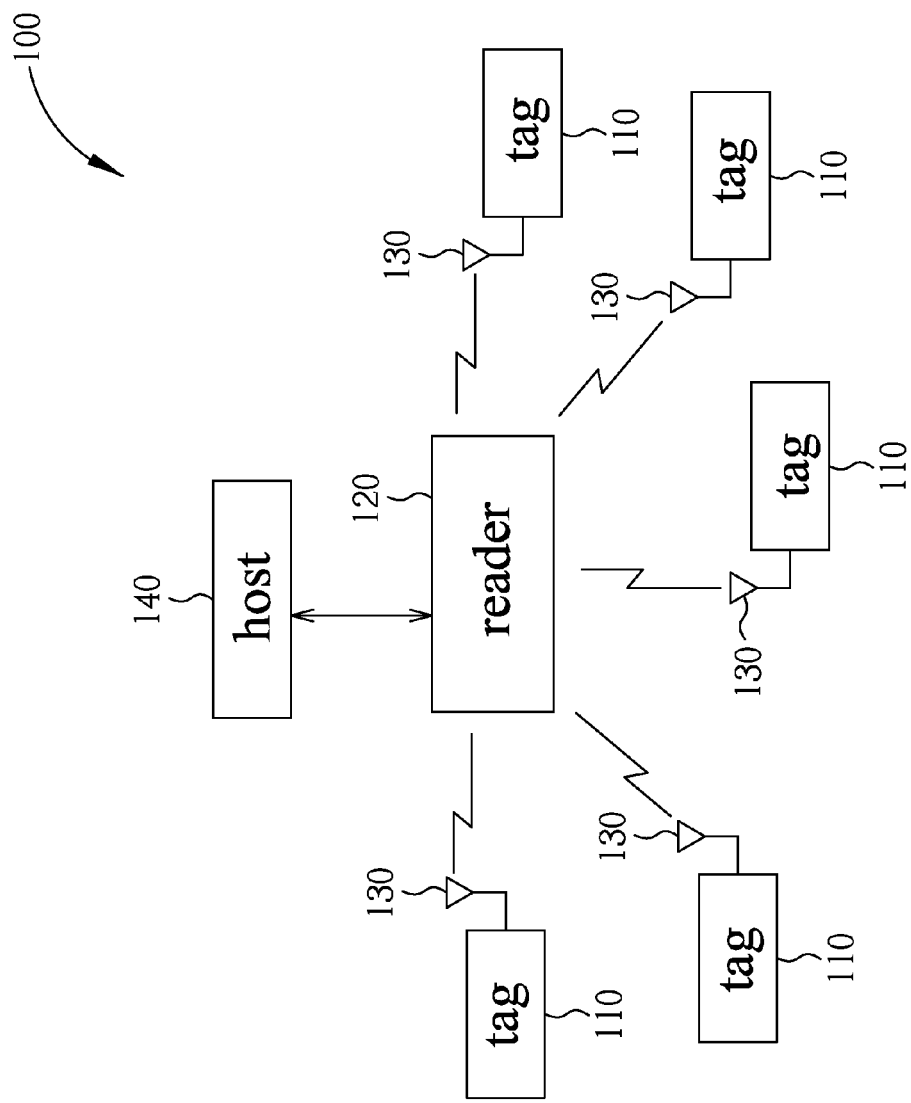
FIG. 1 is a block diagram of a conventional RFID system.
Figure 2:
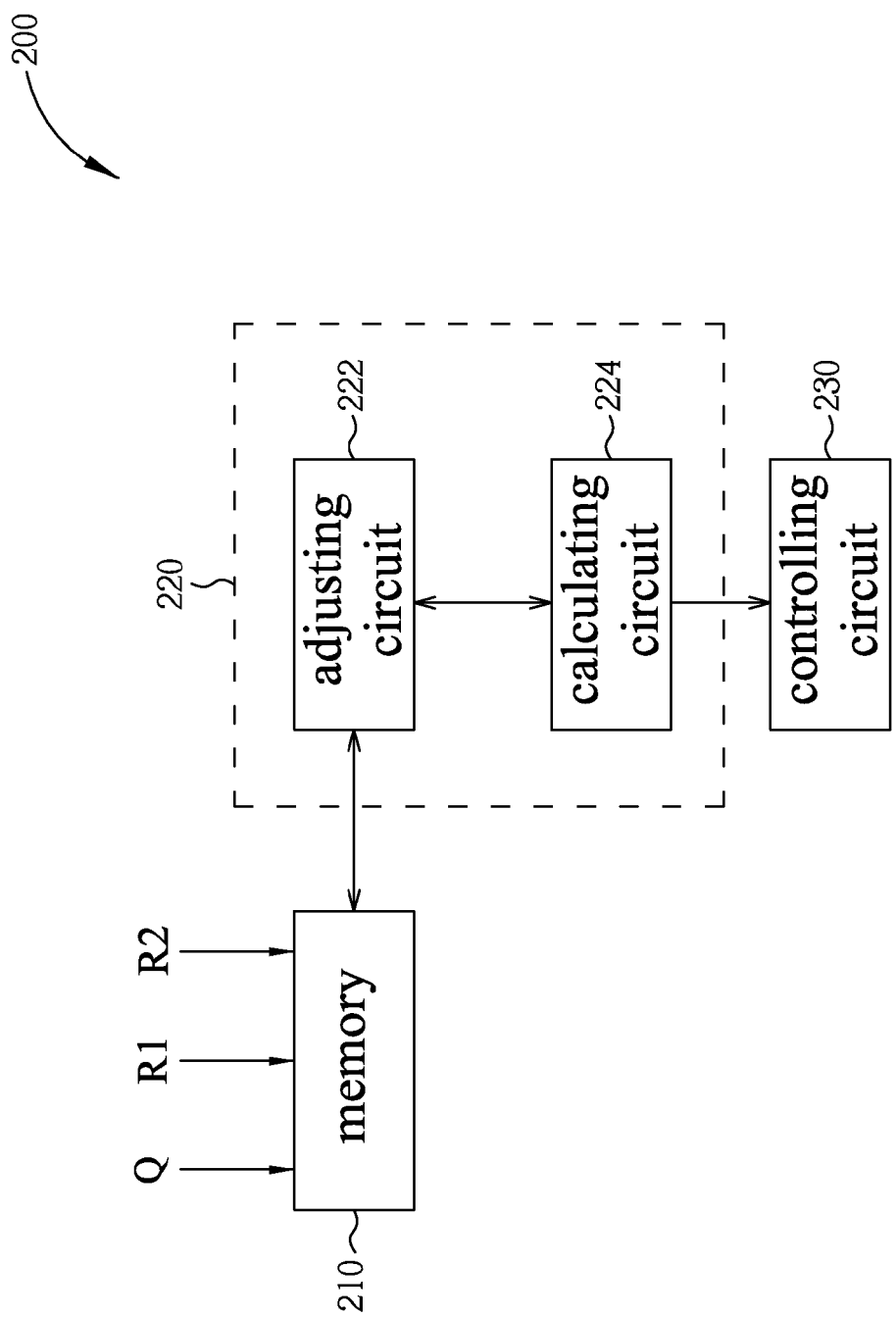
FIG. 2 is a schematic diagram of an access circuit applied to a RFID system according to an embodiment of the present invention.

An RFID tag access method according to the present invention can adjust the probability of an RFID tag being accessed. In the method, at least a reference value is used for adjusting a Q value or a count value. FIG. 2 is a schematic diagram of an access circuit applied to an RFID tag, and the circuit is used for determining whether to respond to a command sent by a reader, such as a reader 120 of an RFID system illustrated in FIG. 1. Referring to FIG. 2, the circuit comprises a memory 210, a count value generating circuit 220, and a controlling circuit 230. The count value generating circuit 220 further comprises an adjusting circuit 222 and a calculating circuit 224. The memory 210 stores a Q value, a count value, and at least one reference value, such as a first reference value R1 and a second reference value R2 according to an embodiment illustrated in FIG. 2. The Q value is a parameter which is set via a command sent by the reader, and the reference value is either built inside the memory 210 or is set via the command sent by the reader.

In a first embodiment of the present invention, the adjusting circuit 222 adjusts the Q value set by the reader according to the first reference value R1, and the calculating circuit 224 generates a count range according to the adjusted Q value. When a count value is selected from the count range by the calculating circuit 224, the controlling circuit 230 determines whether to respond to the command of the reader according to the count value. In a second embodiment, the calculating circuit 224 generates a count range according to the Q value, and selects a count value from the count range. The adjusting circuit 222 then subtracts the second reference value R2 from the count value to generate an adjusted count value. Then, the controlling circuit 230 determines whether to respond to the reader according to the adjusted count value. In addition, a third embodiment is rendered by combining the first embodiment and the second embodiment. The adjusting circuit 222 adjusts the Q value set by the reader according to the first reference value R1, and the calculating circuit 224 generates a count range according to the adjusted Q value. When a count value is selected from the count range, the adjusting circuit 222 further subtracts the second reference value R2 from the count value to generate an adjusted count value. In the foregoing embodiments, the count range or the count value is controlled by way of selecting the first and the second reference values or selecting the adjusting methods of the adjusting circuit 222. Hence, the probability of the count value being equal to 0 can be increased or decreased to adjust the probability of a tag 200 being accessed.

The foregoing embodiment is illustrated in conjunction with a flowchart. Noted that under a premise that the same effect is achieved in practice, the steps of generating the count value by the tag 200 need not be executed as the sequence shown in FIG. 3. The steps in FIG. 3 can be interleaved with other steps of the same flow.

Figure 3:
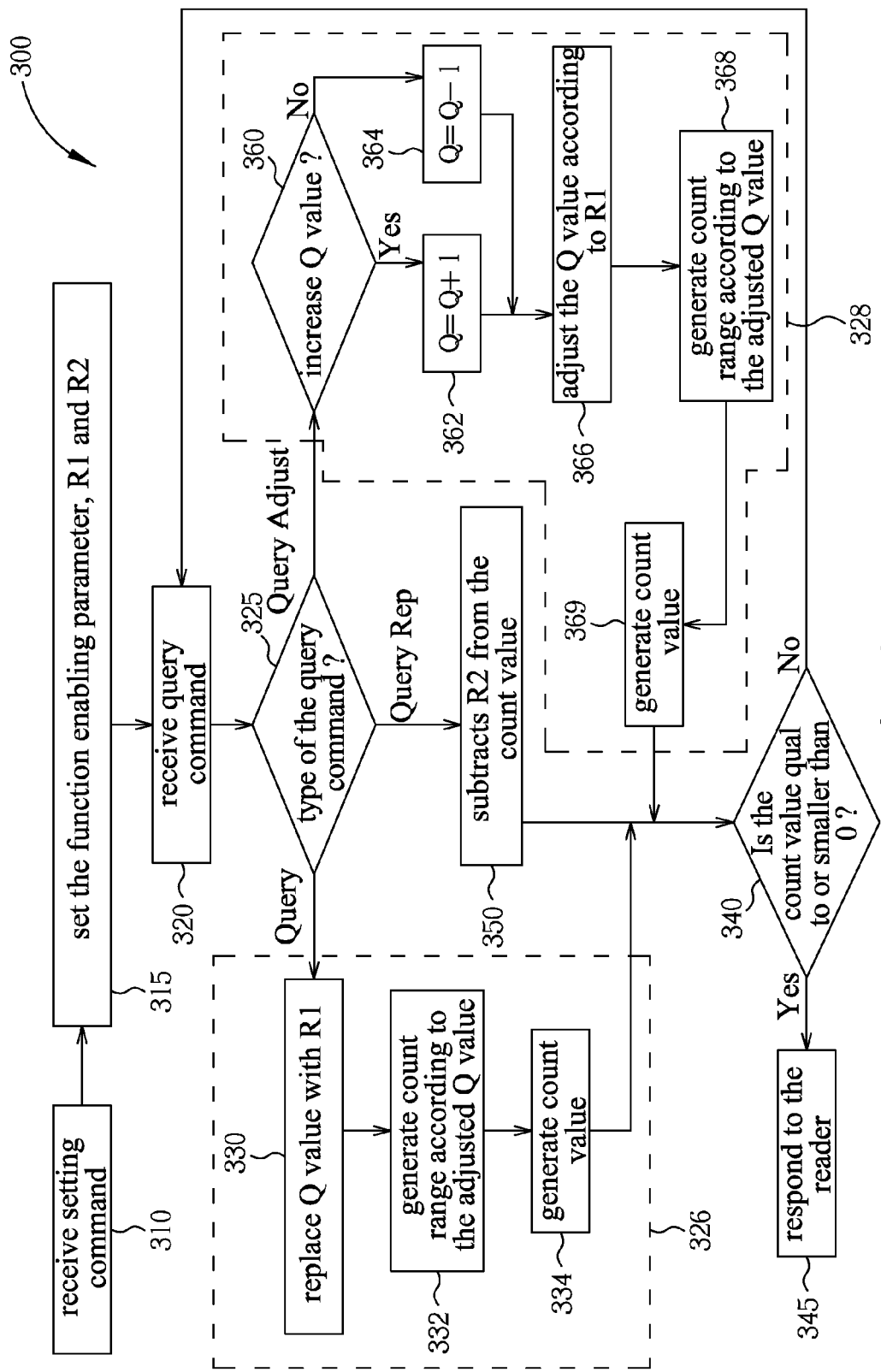
FIG. 3 is flow chart of an access method according to an embodiment of the present invention.

Referring to FIG. 3, the flow that the tag 200 determines whether to respond to a command sent by a reader comprises steps below.

In Step 310, a setting command sent by the reader is received. The setting command comprises a first reference value R1, a second reference value R2, and a function enabling parameter. The function enabling parameter indicates whether the tag 200 uses the first reference value R1 or the second reference value R2 for adjusting a Q value or a count value. For example, when the function enabling parameter is equal to 1, an adjust function of the adjusting circuit 222 within the tag 200 is started; when the function enabling parameter is equal to 0, the adjust function of the adjusting circuit 222 within the tag 200 is shut down, and the tag 200 implements a conventional Q-algorithm to generate the count value. Moreover, as described above, the first reference and the second reference values are set in the memory 210 in advance, and at this point the predetermined first and second reference values may not be contained in the setting command.

Generally speaking, since the setting command comprises parameters, such as the function starting parameter, the first reference value R1, and the second reference value R2, a conventional tag, which doesn't have the adjusting function, cannot identify these parameters. As a result, in order to avoid influencing statuses of other conventional tags and any potential errors, the reader sends the setting command before performing any RFID tag query command.

In Step 315, the tag 200 sets the function enabling parameter, the first reference value R1, and the second reference value R2 in the memory 210 according to the setting command. As mentioned above, the first reference value R1 and the second reference value R2 can also be set in the memory 210 in advance. In an embodiment, the function enabling parameter of the tag 200 is reset via the command of the reader after all tags within a range are accessed.

In Step 320, the tag 200 receives a query command sent by the reader.

In Step 325, the tag 200 determines the type of the query command received, such as a query, a query rep and a query adjust illustrated in FIG. 3. When the query command indicates that the tag 200 begins the query, a first responding procedure 326 is executed so that the tag 200 generates a count value randomly. When the query command indicates repeating the query, a second responding procedure 350 is executed so that the tag 200 adjusts the original count value. When the query command indicates an query adjustment, a third responding procedure 328 is executed so that the tag 200 generates a count value again according to the adjusted Q value.

The first responding procedure 326 comprises Step 330 to Step 334. In Step 330, when the query is executed, the adjusting circuit 222 replaces the Q value in the query command with the first reference value R1. In Step 332, the calculating circuit 224 further generates a count range according to the adjusted Q value, i.e., the first reference value R1. In an embodiment, the count range is from 0 to $2^m-1$, where m is the first reference value R1. In Step 334, the calculating circuit 224 selects a number from the count range as the count value of the tag 200, and stores the count value in the memory 210. In an embodiment, the calculating circuit 224 randomly selects the count value from the count range.

In Step 340, the controlling circuit 230 determines whether the count value is equal to or smaller than 0. When the count value is equal to or smaller than 0, Step 345 of responding to the query command of the reader is executed. Otherwise, Step 320 of receiving a query command is repeated.

In Step 345, the tag 200 enters a reply state after responding to the query command of the reader, and sends an EPC of the tag 200 to the reader after responding to an EPC acknowledge (ACK) command of the reader.

Therefore, in the first responding procedure 326, in order to increase the probability of the tag 200 being accessed, the first reference value R1 is set as being smaller than the Q value to narrow down the count range, and the probability of the number of 0 being randomly selected is further increased. In an embodiment, the Q value is directly replaced with 0 in Step 330. Hence, the number of $2^m-1$ generated in Step 332 is 0 and the count value selected in Step 334 is definitely equal to 0. On the contrary, in order to make the tag 200 be accessed later, the first reference is set as being greater than the Q value to enlarge the count range, so as to decrease the probability of the count value being equal to 0.

The second responding procedure comprises Step 350. In Step 350, when the query command indicates repeating the query, the adjusting circuit 222 subtracts the second reference value R2 from the count value stored in the memory 210 to generate the adjusted count value, which is stored into the memory 210. When the adjusted cont value is equal to or smaller than 0, the tag 200 responds to the query command of the reader. It is to be noted that, the second reference value R2 is equal to or greater than 1, so as to quickly converge the count value to be equal to or smaller than 0.

The third procedure 328 comprises Step 360 to Step 369, which are illustrated as below.

In Step 360, when the query command indicates adjusting the query, the operation of either increasing or decreasing the Q value is performed. For example, when the tags responding to the query command are redundant, the reader increases the Q value; when the query command is unable to get a response, the reader decreases the Q value. When the Q value is increased, Step 362 of correspondingly adding 1 to the Q value is executed; otherwise, Step 364 of correspondingly subtracting 1 from the Q value is executed.

In Step 366, the adjusting circuit 222 adjusts the Q value according to the first reference value R1.

In Step 368, the calculating circuit 224 generates a count range according to the adjusted Q value. In an embodiment, the count range is from 0 to $2^{Q'}-1$, where Q' is the adjusted Q value.

In Step 369, the calculating circuit 224 selects a number from the count range as the count value of the tag 200, and stores the selected count value in the memory 210. In an embodiment, the calculating circuit 224 randomly selects the count value from the count range. When the count value is equal to or smaller than 0, the tag 200 responds to the query command of the reader.

In an embodiment, the adjusting circuit 222 in Step 366 divides the Q value by a function of the first reference value R1, such as $2^m$, where m is the first reference value R1. As a result, an adjusted Q value smaller than Q value is generated to narrow down the count range generated in Step 368 and to further increase the probability of the count value generated in Step 369 being equal to 0, so that the tag 200 is accessed with high priority. In another embodiment, the adjusting circuit 222 multiplies the Q value by a function of the first reference value R1 to enlarge the count range and to decrease the probability of the selected count value being equal to 0, so that the probability of the tag 200 being accessed is decreased.

In conclusion, in an access flow 300, an extra reference value is used for adjusting the Q value or the count value, so as to increase or decrease the probability of generating a condition matching with a command sent by the reader. For example, the condition is that the count value is equal to or smaller than 0. Therefore, the probability of the tag being accessed is adjusted, whereby the tag carrying urgent information is accessed prior to the tag without urgent information.

Frequency segments of the RFID system are generally classified as a low frequency segment covering from 0 kHz to 300 kHz, a high frequency (HF) segment covering from 3 MHz to 30 MHz, an ultra high frequency (UHF) segment covering from 300 MHz to 960 MHz, and a microwave frequency segment covering from 2.45 GHz to 1000 GHz. Application fields, access distances or prices of different frequency segments are respectively different. The tag 200 and the reader according to the foregoing embodiments comply with an EPC generation 2 specification of an RFID system operating in UHF or HE The RFID system, complying with the EPC generation 2 specification, having a large storage volume for storing tag information and being highly accurate, is generally applied to various tags, chips, printers and coders.

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A radio frequency identification (RFID) tag access method for determining whether to respond to a reader command transmitted by an RFID reader, the method comprising steps of:

transmitting a setting command by the RFID reader to a plurality RFID tags within range of the RFID reader for setting a function enabling parameter, a first reference value, and a second reference value in a memory of each of the plurality of the RFID tags before querying responses from the RFID tags;

storing the function enabling parameter, the first reference value, and the second reference value in each of the plurality of the RFID tags; wherein the function enabling parameter indicates whether a count value generating circuit of the RFID tag is enabled to use the first reference value for adjusting a Q value in the reader command and uses the second reference value for adjusting a count value generated by the RFID tag, wherein the second reference value is equal to or greater than 1;

receiving, by the RFID tag, the reader command including the Q value sent by the RFID reader, wherein:

when the RFID tag determines that the reader command is a query command that indicates the RFID tag to begin a query, and that the function enabling parameter indicates the count value generating circuit is enabled to use the first reference value for adjusting the Q value, replacing, by the RFID tag, the Q value in the query command with the first reference value to generate an adjusted Q value and generating a count range according to the adjusted Q value;

selecting the count value within the count range and storing the count value in the memory of the RFID tag; and determining whether the RFID tag should respond to the query command sent by the reader according to the count value;

when the RFID tag determines that the reader command is the query command being repeated indicating the RFID tag to execute a query repeat process, and that the function enabling parameter indicates the count value generating circuit is enabled to use the second reference value for adjusting the count value stored in the memory of the RFID tag, subtracting the second reference value from the count value to generate an adjusted count value;

determining whether the RFID tag should respond to the repeated query command sent by the RFID reader according to the adjusted count value;

when the RFID tag determines that the reader command is a query adjust command issued by the reader when the reader receives redundant responses from the tags or is unable to get a response, increasing or decreasing the Q value by 1;

adjusting the increased/decreased Q value by the RFID tag according to a function of the first reference value to generate the adjusted Q value when the function enabling parameter indicates the count value generating circuit is enabled to use the first reference value for adjusting the Q value;

generating the count range according to the adjusted Q value;

selecting the count value within the count range; and determining whether the RFID tag should respond to the query adjust command sent by the RFID reader according to the count value.

2. The access method as claimed in claim 1, wherein the adjusted Q value is smaller than the Q value.

3. The access method as claimed in claim 1, wherein the function enabling parameter stored in each of the plurality of RFID tags is reset via a command sent by the RFID reader after all the plurality of RFID tags within the range of the RFID reader are accessed.

4. The access method as claimed in claim 1, wherein the RFID tag is in compliance with a generation 2 specification of an electronic product code operating in ultra high frequency or high frequency.

5. An access circuit of an RFID tag for determining whether to respond to a reader command transmitted by an RFID reader, the access circuit comprising:
- a memory, for storing a function enabling parameter, a first reference value, and a second reference value all included in a setting command transmitted by the RFID reader to a plurality of RFID tags within range of the RFID reader before querying responses from the plurality RFID tags, wherein the second reference value is greater than or equal to 1, and the function enabling parameter indicates whether a count value generating circuit of the RFID tag is enabled to use the first reference value for adjusting a Q value and uses the second reference value for adjusting a count value generated by the RFID tag;
- the count value generating circuit comprising:
  - an adjusting circuit, for adjusting the Q value, embedded in the reader command transmitted by the RFID reader, to generate an adjusted Q value according to the reader command, wherein:
  - when the RFID tag determines that the reader command is a query command that indicates the RFID tag to begin a query, and that the function enabling parameter indicates the count value generating circuit is enabled to use the first reference value for adjusting the Q value,
    the adjusting circuit replaces the Q value with the first reference value to generate the adjusted Q value, which is provided to a calculating circuit of the RFID tag to generate a count range according to the adjusted Q value; and wherein the calculating circuit selects a count value from the count range;
  - when the RFID tag determines that the reader command is the query command being repeated, indicating the RFID tag to execute a query repeat process, and that the function enabling parameter indicates the count value generating circuit is enabled to use the second reference value for adjusting the count value stored in the memory of the RFID tag,
    the calculating circuit subtracts the second reference value from the count value to generate an adjusted count value; and
  - when the RFID tag determines that the reader command is a query adjust command issued by the reader when the reader receives redundant responses from the tags or is unable to get a response, the adjusting circuit increases or decreases the Q value by 1, and the adjusting circuit adjusts the increased/decreased Q value according to a function of the first reference value to generate the adjusted Q value when the function enabling parameter indicates the count value generating circuit is enabled to use the first reference value for adjusting the Q value to generate the adjusted Q value for the calculating circuit to calculate the count range;
- the calculating circuit, for generating the count range according to the adjusted Q value and selecting the count value from the count range; and
- a controlling circuit, for determining whether the RFID tag should respond to the reader command sent by the RFID reader when the count value is equal to or smaller than zero;
- wherein when the count value is greater than zero, the adjusting circuit further subtracts the second reference value from the count value to generate an adjusted count value according to the function enabling parameter, and the controlling circuit determines whether the RFID tag should respond to the reader command according to the adjusted count value.

6. The access circuit as claimed in claim 5, wherein the function enabling parameter of each of the plurality RFID tags is reset via a command sent by the RFID reader after all the plurality RFID tags within the range of the RFID reader are accessed.

7. The access circuit as claimed in claim 5, wherein the adjusting circuit calculates the Q value according to the first reference value to generate the adjusted Q value, wherein the adjusted Q value is smaller than the Q value.

8. The access circuit as claimed in claim 5, wherein the RFID tag is in compliance with a generation 2 specification of an electronic product code operating in ultra high frequency or high frequency.

* * * * *